US008731290B1

(12) United States Patent
Srinivasan et al.

(10) Patent No.: US 8,731,290 B1
(45) Date of Patent: May 20, 2014

(54) ADAPTIVE HISTOGRAM-BASED VIDEO CONTRAST ENHANCEMENT

(75) Inventors: Sujith Srinivasan, Indaranagar (IN); Nikhil Balram, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 55 days.

(21) Appl. No.: 13/614,910

(22) Filed: Sep. 13, 2012

Related U.S. Application Data

(62) Division of application No. 11/295,750, filed on Dec. 7, 2005, now Pat. No. 8,295,596.

(51) Int. Cl.
G06K 9/00 (2006.01)
G06K 9/40 (2006.01)

(52) U.S. Cl.
USPC .......................................... 382/168; 382/274

(58) Field of Classification Search
USPC .................................. 382/168, 274
See application file for complete search history.

(56) References Cited

U.S. PATENT DOCUMENTS

| 4,450,482 | A | 5/1984 | Ackermann | |
|---|---|---|---|---|
| 5,537,071 | A * | 7/1996 | Jaspers | 327/346 |
| 5,668,890 | A * | 9/1997 | Winkelman | 382/167 |
| 5,857,033 | A | 1/1999 | Kim | |
| 6,075,890 | A * | 6/2000 | Park | 382/169 |
| 6,078,686 | A | 6/2000 | Kim | |
| 6,259,472 | B1 * | 7/2001 | Park | 348/28 |
| 6,507,372 | B1 | 1/2003 | Kim | |
| 6,700,628 | B1 | 3/2004 | Kim | |
| 7,003,153 | B1 | 2/2006 | Kerofsky | |
| 7,424,148 | B2 * | 9/2008 | Goh | 382/169 |
| 2003/0161549 | A1 * | 8/2003 | Lei et al. | 382/274 |
| 2004/0008903 | A1 * | 1/2004 | Kim | 382/274 |
| 2005/0100242 | A1 * | 5/2005 | Trifonov et al. | 382/274 |
| 2006/0164523 | A1 | 7/2006 | Jiang et al. | |

* cited by examiner

Primary Examiner — John Strege

(57) ABSTRACT

The adaptive contrast enhancer uses an adaptive histogram equalization-based approach to improve contrast in a video signal. For each video frame, the histogram of the pixel luminance values is calculated. The calculated histogram is divided into three regions that are equalized independently of the other. The equalized values are averaged with the original pixel values with a weighting factor that depends on the shape of the histogram. The weighting factors can be also chosen differently for the three regions to enhance the darker regions more than the brighter ones. The statistics calculated from one frame are used to enhance the next frame such that frame buffers are not required. Many of the calculations are done in the inactive time between two frames.

20 Claims, 5 Drawing Sheets

ADAPTIVE HISTOGRAM-BASED VIDEO CONTRAST ENHANCEMENT

CROSS REFERENCE TO RELATED APPLICATION

This application is a division of U.S. patent application Ser. No. 11/295,750, filed Dec. 7, 2005, (currently pending), which is hereby incorporated by reference herein in its entirety.

FIELD OF THE INVENTION

The present invention relates generally to image and video processing, and more particularly to contrast enhancement.

BACKGROUND OF THE INVENTION

Contrast enhancement is used to improve the picture quality of digital video and is often implemented using video processors. Although many image processing techniques exist for contrast enhancement, they are often unsuitable for an ASIC implementation because of their computational complexity and/or storage requirements. Additionally, many image processing techniques might not work for video, because the picture is continuously changing and many algorithms may be prone to artifacts like contouring and saturation of gray levels.

Because contrast enhancement is usually performed in a color space that separates brightness information from color, most algorithms operate on data in formats such as YCbCr, HSV, and the like. For video applications, the YCbCr format is typically used because it is the industry standard for video transmission and storage. The YCbCr format is also typically easier to convert to and from RGB than from HSV. The ease in conversion is important because the final display is usually configured to accept data in RGB format.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
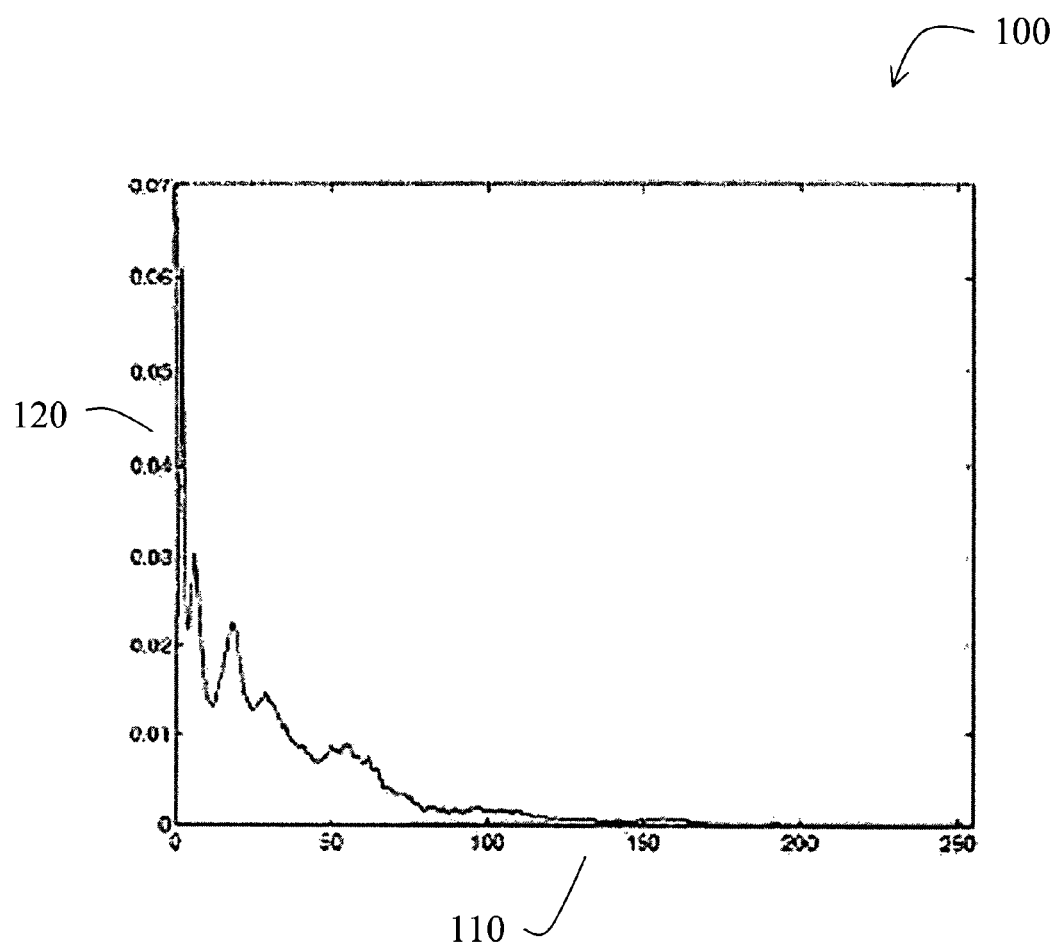
FIG. 1 is an example pre-processing histogram of an image.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed to adaptive contrast enhancement using an adaptive histogram equalization-based approach to improve contrast in a video signal. For each video frame, the histogram of the pixel luminance values is calculated. The calculated histogram is divided into three regions that are equalized independently of the other. The equalized values are averaged with the original pixel values with a weighting factor that depends on the shape of the histogram. The weighting factors can be also chosen differently for the three regions for example to enhance the darker regions more than the brighter ones, or vice-versa. The statistics calculated from one frame are used to enhance the next frame such that frame buffers are not required. Alternatively, if it is desired to use the same statistics from one frame to enhance the same frame, this can be achieved by simple insertion of a frame buffer stage between the generation of the statistics and the application of them. Many of the calculations are done in the inactive time between two frames.

Contrast enhancement is performed using the luminance or brightness part of the video signal. The YCbCr color space is typically used for contrast enhancement because the luminance and color information are separate and can be processed independently. The YCbCr color space is also one of the common video exchange formats that is currently used. "Y" is the luminance (usually referred to as luma) of the video while "Cb" and "Cr" are the chroma or color components. Another advantage of transmitting signals in YCbCr format is that the bandwidth of the signal can also be reduced by down-sampling the chrominance signals. Down-sampling is visually acceptable because the human vision system is typically more sensitive to brightness than to color. Y, Cb and Cr are usually assigned values ranging from 0 to 255 in an 8-bit system. When an offset of 128 is removed from Cb and Cr, the YCbCr space is referred to as the YUV space. In YUV space, U and V range from −128 to 127.

Data in RGB format can be converted to YUV using a set of linear equations such as:

$$\begin{pmatrix} Y \\ U \\ V \end{pmatrix} = \begin{bmatrix} 0.299 & 0.587 & 0.114 \\ -0.172 & -0.339 & 0.511 \\ 0.511 & -0.428 & -0.083 \end{bmatrix} \begin{pmatrix} R \\ G \\ B \end{pmatrix} \quad (1)$$

where R, G, B and Y range from 0 to 255 while U and V range from −128 to 127. In the following example system, an 8-bit system is demonstrated.

The conversion coefficients in equation (1) are specified by the ITU-601 specification (SDTV) video standard. The inverse equation is used to convert YUV signals into an RGB format as follows:

$$\begin{pmatrix} R \\ G \\ B \end{pmatrix} = \begin{bmatrix} 1 & 0 & 0.371 \\ 1 & -0.0698 & -0.336 \\ 1 & 1.732 & 0 \end{bmatrix} \begin{pmatrix} Y \\ U \\ V \end{pmatrix} \quad (2)$$

FIG. 1 is an example pre-processing histogram of an image. Histogram equalization is an image processing technique that is used to improve picture contrast. Histograms of an image typically illustrate a count of the number of pixels of the image at each luma level. The x-axis (110) of the histogram 100 represents luma values that range from 0 to 255. The y-axis (120) is used to represent the number of pixels at each luma value. When the values on the y-axis are divided by the total number of pixels in the image, the values represent the probability or frequency of occurrence of each such luma value in that image. In the example histogram 100, the frequency of occurrence is shown as a probability density function (pdf). The histogram provides a wealth of information about the brightness properties of the image but spatial information is not ordinarily preserved. Thus images have an associated histogram, but histograms are not used to derive an image.

Figure 2:
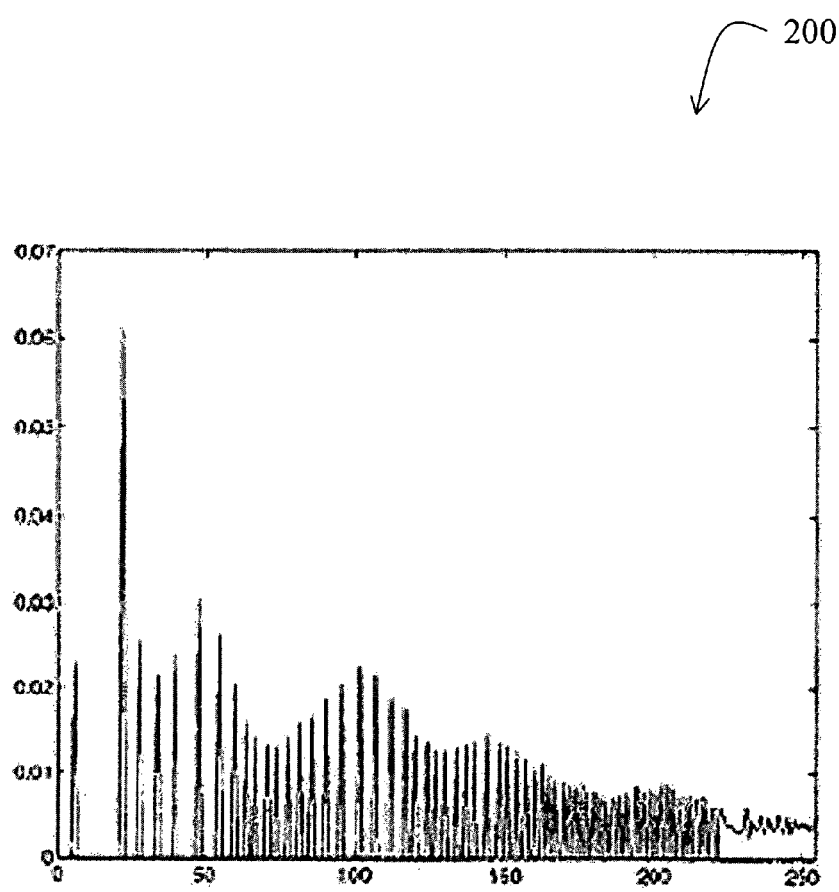
FIG. 2 is an example histogram of an image that has been equalized.

FIG. 2 is an example histogram of an image that has been equalized. Histogram equalization operates in accordance with the principle that images with good contrast typically have uniform histograms. (In practice, there may be exceptions.) Skewing histograms to low luma values (or concentrating the histograms within a particular range of luma values), the appearance of the image can be improved with contrast enhancement.

Histogram equalization attempts to "stretch" the histogram to improve the picture contrast. Comparing histogram 100 with histogram 200, it is evident that the stretching is performed more at the peaks of the histogram while compression is performed at the troughs of the histogram.

Mathematically, histogram equalization can be described as follows: Let n be the total number of pixels in the image and $n_k$ be the number of pixels with luma value $y_k$. Then, probability density function (pdf) can be defined as $$f_k(y) = \frac{n_k}{n}$$

and cumulative density function (cdf) can be defined as $$F_k(y) = \sum_{i=0}^{i=k} f_k(y_i).$$

An example cdf at any luma $y_k$ represents the probability of a pixel having a luma value equal to or less than $y_k$ in the image. The cdf is a non-decreasing function that varies from $F_k(0)$ (the probability of points with luma value 0) to $F_k(255)=1$ (the probability of points with luma value being less than or equal to 255).

Where $y_{min}$ is the lowest luma value present in an image and $y_{max}$ is the highest present in the image, for every input pixel $y_{in}$ the output $y_{eq}$ can be given by $$y_{eq} = y_{min} + (y_{max} - y_{min})F_k(y_{in}) \quad (3)$$

Thus for every input pixel, Equation (3) gives a mapping to find the output in accordance with the cdf.

Figure 3:
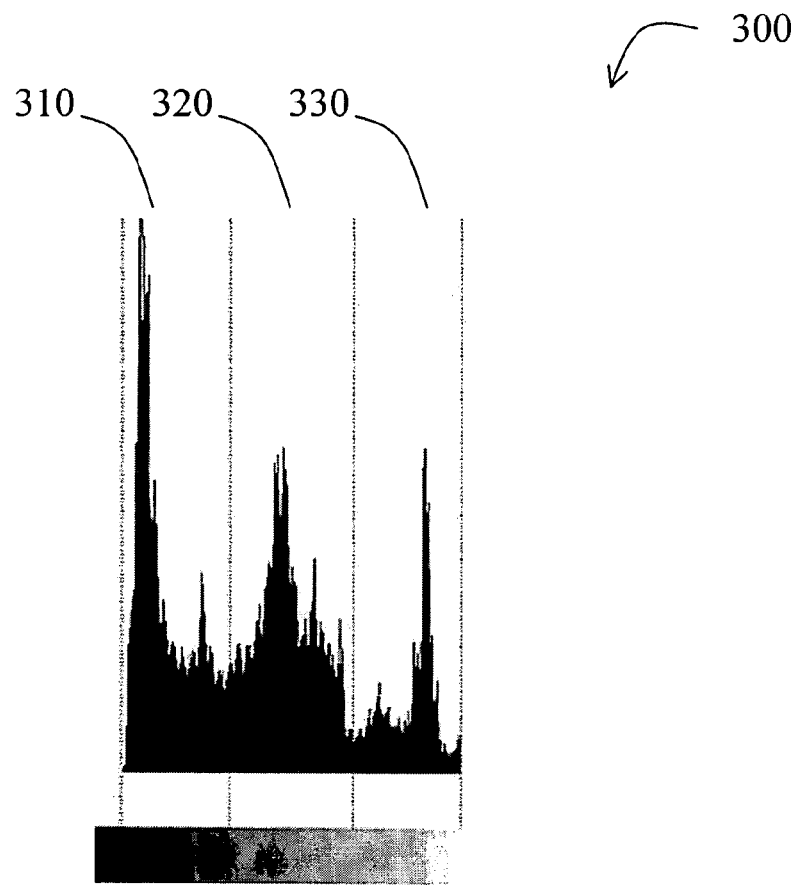
FIG. 3 is an example histogram of an image that has been divided into three regions in accordance with the present invention.

By itself, histogram equalization is not typically used in conventional contrast enhancement because it is prone to contouring, noise enhancement and gray level crushing. In an embodiment adaptive contrast enhancement scheme, the histogram is first divided into three equally spaced regions, corresponding to "shadows", "mid-tones" and "highlights" in standard terminology used in photography, where the cdf of each region is found separately. FIG. 3 is an example histogram of an image that has been divided into three regions in accordance with the present invention.

The splitting of the histogram (300) into three regions facilitates processing each region independently of the other. Splitting the image into regions into a dark region (310), a mid-level brightness region (320), and a bright region (330) allows independent processing of the regions in accordance with the kind of region. For example, a greater level of enhancement is desired in the dark regions of the image to obtain a perceptually more pleasing image. Compared to the dark regions, the mid level regions and bright regions of the image are typically enhanced less. Dividing the histogram and treating each partition separately enables this functionality.

The output pixel is then found using the equation $$y_{out} = wf \times y_{eq} + (1-wf) \times y_{in} \quad (4)$$

where $y_{eq}$ can be calculated from equation (3) and $y_{in}$ is the brightness of the original pixel. Equation (4) provides a weighted average between the original and equalized values for each pixel where wf is a weighting factor that can range from 0 to 1. The values $y_{eq}$ and wf are typically calculated for each of the three regions independently. The blending process controls the level of contrast enhancement for each region.

As shown in equation (4), the weighting factors control the level of blending between equalized and original luma values, and thus control the level of enhancement. In the example contrast enhancement scheme, the weighting factors are calculated automatically using an approximate variance of the histogram (again separately by region). First the arithmetic mean of each region is calculated using $$m_i = \frac{\sum_j y_j}{N} \quad (5)$$

where $y_j$ represents luma of points in a particular region i and N is the total number of points in that region. The index i can be (for example) 0, 1 or 2 for dark, mid-level, and bright regions of the histogram.

Using the means, the variances of each region can be calculated using $$\sigma_i = \frac{1}{N} \sum_j n(y_j)(|y_j - m_i|) \quad (6)$$

where $n(y_j)$ is a count of the number of pixels of luma $y_j$ and $\sigma_i$ is the variance of the ith region. The summation is typically carried out only for points of a single region to get the variance of that region. In the example equation, $\sigma_i$ is an approximation of the true variance. Calculating a more exact variance involves more multipliers and a square root operation (which is computationally intensive and/or requires a significant amount of circuitry to implement). Using the approximate variance shown above produces visually appealing results while reducing hardware requirements (over calculating a more exact variance).

Figure 4:
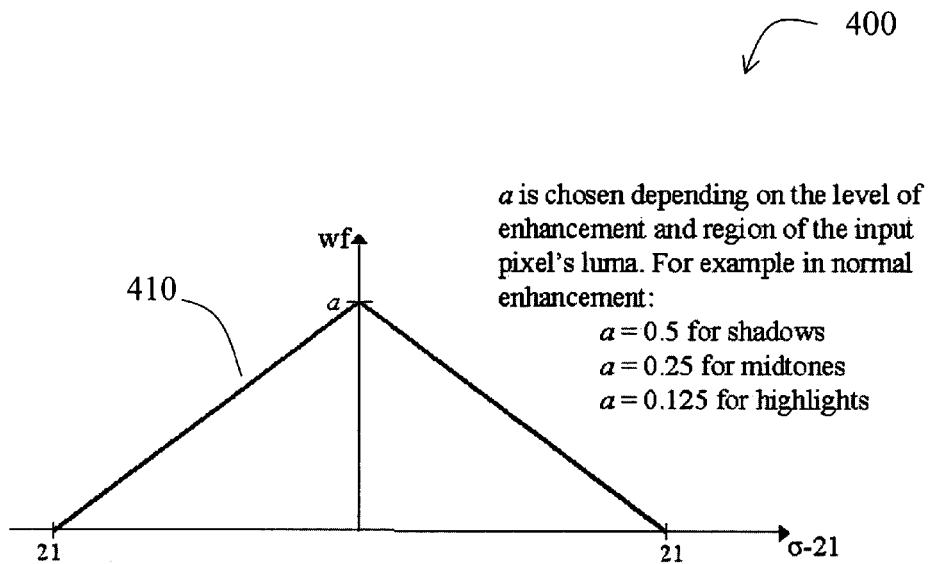
FIG. 4 illustrates example calculations of weighting factors in accordance with the present invention.

FIG. 4 illustrates example calculations of weighting factors in accordance with the present invention. The weighting factors can be calculated (after the variances have been calculated) using an example relationship as shown in FIG. 4. The weighting factor curve (400) can be chosen in accordance with the following factors. First, the variance is shown as being limited to a value between 0 and 42 such that the width of each partition of the histogram is 84 (255 integer-divided by 3). The variance is lower when the histogram is concentrated within smaller ranges. When the histogram is concentrated within smaller ranges, a low weighting factor is used because an image with a concentrated histogram is susceptible to contouring.

The variance is higher, for example, when the histogram has two peaks at each extremity of the partition. For this case, contrast enhancement is not as beneficial and hence a low weighting factor is typically used. For other shapes of the histogram, the variance would range between 0 and 42 and the triangular shape curve is chosen. The level of enhancement is usually highest for a histogram having a mid-level variance and that tapers off in a linear fashion on both sides. Using a shape-based weighting of contrast enhancement helps to reduce artifacts such as contouring in the output image and changes the level of enhancement that is optimized for a particular image.

The peak of the triangularly shaped weighting factor curve 410 in FIG. 4 is different for each partition of histogram. Weighting factor curve 410 provides another control over the level of enhancement depending on the region of the image. For darker regions the curve is higher, which provides more enhancement in the darker regions of the image. The mid luma and bright regions of the image are enhanced to a lesser degree.

Figure 5:
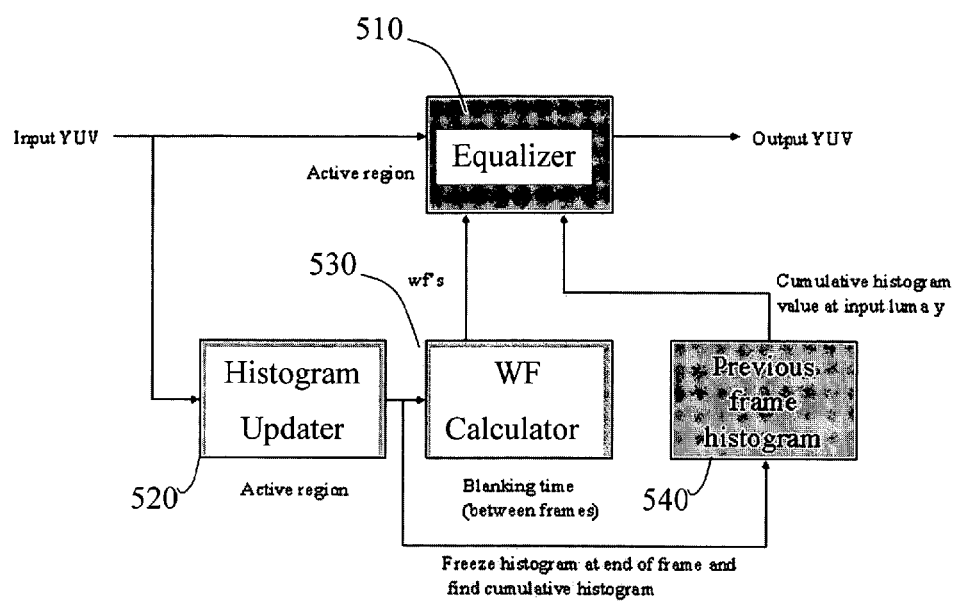
FIG. 5 is a block diagram of a contrast enhancer in accordance with the present invention.

FIG. 5 is a block diagram of a contrast enhancer in accordance with the present invention. Contrast enhancer 500 comprises equalizer 510, histogram updater 520, weighting factor calculator 530, and previous frame histogram memory 540. In operation, an input YUV data stream is supplied to equalizer 510 as well as to histogram updater 520. A histogram for each region (in the example, one each of three regions) of an image frame is stored in a 256 word SRAM.

Along with the histogram, counters with number of points and luma sums are updated for each of the three regions, which are then used to calculate the mean of each region. Because processes are done on the live frame, the pdf is ordinarily not calculated. The pdf is not calculated because the pdf is derived using a division at each histogram location. Calculating the pdf is computationally intensive so typically the histogram and cumulative histogram are computed without calculating the pdf.

The histogram updating is typically completed at the end of the live frame. During the blanking interval, the means are calculated and the cumulative sum of the histogram performed. The accumulation can be done by reading the histogram value from each memory location and replacing it with the cumulative value. At the end of each region, the accumulation is typically reset. Along with the cumulative sum, the values read from the histogram are used to accumulate and calculate the variances using equation (6). Once the variances are calculated, the weighting factors are calculated and sent to the equalizer 510. The reciprocal of the number of points in each region is used to calculate the mean and variance and also sent to equalizer 510.

In equalizer 510, the output is calculated as in equation (3) using the input luma, weighting factors, reciprocal of the number of points and cumulative histogram, which has been stored from the previous frame in memory. The cdf is obtained from the cumulative histogram using the reciprocals of the number of points for division. Thus the statistics of the previous frame can be used to enhance the current frame. However since the cdf of the previous frame is required to process the current one, the histogram of the current frame is stored in another memory. Thus two memories are used and can be alternated between holding the current histogram and previous cumulative histogram.

In an alternate embodiment, the two memories can be used and alternated between holding the current histogram and previous cumulative histogram on a real-time basis where statistics from same frame are used upon on the same frame (as compared to being used on the next frame). The structure can remain the same with the two memories, with the difference that the statistics generation is now operating on the frame that is being written to frame buffer, while the enhancement is using the stored statistics and being applied to the previous frame that is being read out of the frame buffer. Sujit can you create a high-level block diagram similar to FIG. 5 that shows how this would look—you will need to add a frame buffer in the input YUV path to the "Equalizer" while continuing to use the current input live in the "Histogram Updater" and somehow breaking up the "Previous frame histogram" to show the "Previous frame histogram" going to "Equalizer" while the "Current frame histogram" is being calculated from the live data.

An adaptive contrast enhancement scheme for digital video is described herein. An example method uses a histogram equalization based method that works by dividing the histogram into three equal partitions, calculating the equalization parameters for each of them independently, and then blending the equalized luma values with the original ones. The histogram shape of each region controls this blending.

The level of enhancement can also be varied for different regions. By controlling the enhancement based on the histogram shape, the method reduces contouring in images that have sharp peaks in their histograms. By controlling the enhancement based on luma, the method can enhance darker regions more than brighter ones, which leads to perceptually better images than traditional histogram equalization based schemes.

The method is also relatively easy to implement in digital logic. The only storage required is a memory to store histograms because the enhancement is applied to each video frame based upon the previous one. Many calculations that are done during inactive signal time can also be optimized for area reduction for implementation logic circuitry.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

We claim:

1. A contrast enhancement system, comprising:
   a histogram updater that is configured to provide a current-frame cumulative histogram based on a received image frame, to divide the current-frame histogram into regions, to determine an arithmetic mean for at least two of the regions of the current-frame histogram, and to calculate variances for each of the determined arithmetic means;
   a weighting factor calculator that is configured to calculate weighting factors based on the calculated variances; and
   an equalizer that is configured to transform pixel values of the received image frame using the weighting factors and statistics from a previous-frame cumulative histogram.

2. The system of claim 1, wherein the histogram updater is configured to determine the arithmetic means in accordance with the equation $$m_i = \frac{\sum_j y_j}{N}$$

where $y_j$ represents luma of points in a particular region i and N is the total number of points in that region.

3. The system of claim 2, wherein the histogram updater is configured to calculate the variances in accordance with the equation $$\sigma_i = \frac{1}{N} \sum_j n(y_j)(|y_j - m_i|)$$

where $n(y_j)$ is a count of the number of pixels of luma $y_j$ and $\sigma_i$ is the variance of the ith region.

4. The system of claim 1, wherein the equalizer is configured to transform pixels of the received video frame using the equation of claim 3.

5. The system of claim 1, wherein the current-frame cumulative histogram and the previous-frame cumulative histogram are stored in two memories, on an alternating basis, in response to receiving the received image frame.

6. The system of claim 5, wherein a cumulative density function result set for a current frame is stored in a first memory for the current-frame cumulative histogram, and a cumulative density function result set for a previous frame is stored in a second memory for the previous-frame cumulative histogram.

7. The system of claim 5, wherein a cumulative density function result set for a current frame is stored in a first memory for the current-frame cumulative histogram, and a cumulative density function result set for a previous frame is applied to a previous frame that is being output from the second memory.

8. The system of claim 1, wherein the statistics from the previous-frame cumulative histogram include a reciprocal of a number of points in each region.

9. The system of claim 3, wherein the weighting factor calculator is configured to calculate the weighting factors in accordance with a weighting factor curve that defines a weighting factor for each calculated variance.

10. The system of claim 9, wherein each region has a respective weighting factor curve that depends on a desired level of enhancement.

11. A method for enhancing contrast of an image, comprising:
   generating a current-frame cumulative histogram based on a received image frame;
   dividing the current-frame histogram into regions;
   determining an arithmetic mean for at least two of the regions of the current-frame histogram;
   calculating variances for each of the determined arithmetic means;
   calculating weighting factors based on the calculated variances; and
   transforming pixel values of the received image frame using the weighting factors and statistics from a previous-frame cumulative histogram.

12. The method of claim 11, wherein the arithmetic means are determined in accordance with the equation $$m_i = \frac{\sum_j y_j}{N},$$

where $y_j$ represents luma of points in a particular region i and N is the total number of points in that region.

13. The method of claim 12, wherein the variances are calculated in accordance with the equation $$\sigma_i = \frac{1}{N} \sum_j n(y_j)(|y_j - m_i|),$$

where $n(y_j)$ is a count of the number of pixels of luma $y_j$ and $\sigma_i$ is the variance of the ith region.

14. The method of claim 11, wherein the pixels of the received video frame are transformed using the equation of claim 13.

15. The method of claim 11 further comprising storing the current-frame cumulative histogram and the previous-frame cumulative histogram in two memories, on an alternating basis.

16. The method of claim 15 further comprising storing a cumulative density function result set for a current frame in a first memory for the current-frame cumulative histogram, and a cumulative density function result set for a previous frame in a second memory for the previous-frame cumulative histogram.

17. The method of claim 15 further comprising:
   storing a cumulative density function result set for a current frame in a first memory for the current-frame cumulative histogram; and
   applying a cumulative density function result set for a previous frame to a previous frame that is being output from the second memory.

18. The method of claim 11, wherein the statistics from the previous-frame cumulative histogram include a reciprocal of a number of points in each region.

19. The method of claim 18 further comprising calculating the weighting factors in accordance with a weighting factor curve that defines a weighting factor for each calculated variance.

20. The method of claim 19, wherein each region has a respective weighting factor curve that depends on a desired level of enhancement.

* * * * *